United States Patent [19]

Quick et al.

[11] Patent Number: 5,191,642
[45] Date of Patent: Mar. 2, 1993

[54] METHOD FOR EFFICIENTLY ALLOCATING COMPUTER RESOURCE FOR REAL TIME IMAGE GENERATION

[75] Inventors: Lee T. Quick; William M. Bunker, both of Ormond Beach, Fla.

[73] Assignee: General Electric Company, Philadelphia, Pa.

[21] Appl. No.: 498,475

[22] Filed: Mar. 22, 1990

Related U.S. Application Data

[63] Continuation of Ser. No. 36,425, Apr. 9, 1987, abandoned.

[51] Int. Cl.5 ............................................. G06F 15/72
[52] U.S. Cl. ..................................... 395/127; 395/118; 395/137; 395/133; 340/727
[58] Field of Search ................ 364/521, 522; 340/723, 340/729, 731, 747, 727, 724; 395/137, 133, 127, 118; 382/9

[56] References Cited

U.S. PATENT DOCUMENTS

| | | | |
|---|---|---|---|
| 4,208,719 | 6/1980 | Lotz et al. | 364/515 |
| 4,291,380 | 9/1981 | Rohner | 364/522 |
| 4,425,559 | 1/1984 | Sherman | 340/747 |
| 4,625,289 | 11/1986 | Rockwood | 364/522 |
| 4,646,134 | 2/1987 | Komatsu et al. | 358/11 |
| 4,725,831 | 2/1988 | Coleman | 340/747 |
| 4,734,690 | 3/1988 | Waller | 340/729 |

OTHER PUBLICATIONS

Newman et al. "Principles of Interactive Computer Graphics" McGraw Hill Book Company-1979 pp. 309-331.
Hanna et al "Interactions of Parametric Surfaces by Means of Look-Up Tables" IEEE CG & A Oct. 1983 pp. 39-47.

Primary Examiner—Gary V. Harkcom
Assistant Examiner—Phu K. Nguyen
Attorney, Agent, or Firm—Geoffrey H. Krauss; Paul Checkovich

[57] ABSTRACT

In a real-time computer-image generation system, processing resources for manipulating polygons that define objects are generally limited. This results in a trade-off with respect to the amount of detail to be displayed in an object versus the number and type of objects to be displayed. The value of a predetermined viewing criterion is used to determine when an object can be represented by a single polygon. The single polygon is rotatable about a predetermined number of axes for maintaining a predetermined relationship with respect to a view point. Since processing resources are saved by using a single polygon, additional objects and/or more detail may be included in a display.

16 Claims, 3 Drawing Sheets

METHOD FOR EFFICIENTLY ALLOCATING COMPUTER RESOURCE FOR REAL TIME IMAGE GENERATION

This application is a continuation of application Ser. No. 07/036,425, filed Apr. 9, 1987, now abandoned.

BACKGROUND OF THE INVENTION

This invention relates to a method for efficiently allocating computing resources and, more particularly, to a method for reducing computing resources required to process images of objects in real-time so that the resources saved may be used to perform other tasks, like processing increased detail in other images of objects and/or increasing the number of images of objects presented.

In real-time computer image generation systems, the detail with which objects in a scene can be displayed is limited by the number of computations that can be performed during an update interval of the display. For example, in one common scheme similar to a U.S. television standard, a field is updated every 1/60 second. Two fields are interleaved on the display to provide an entire scene description. Thus, all computations for describing elements to be displayed in a scene must be performed within 1/60 second every 1/60 second.

Objects in a scene are typically defined by a predetermined number of polygons, or faces, with greater detail requiring more polygons. In a real-time display system wherein the relation between an object and a viewer is changing, the orientation and positioning of each polygon, along with characteristics, such as texturing and shading, assigned to each polygon must be calculated during each update interval. This results in a tradeoff based on objective and/or subjective criteria with respect to the amount of detail to be displayed in each object versus the number and type of objects to be displayed.

Addition of greater computing capability for processing additional polygons is expensive, increases hardware size and may not be feasible.

Thus, it would be desirable to reduce the number of polygons that must be processed for displaying an object so that the number of polygons processed elsewhere in the scene can be increased, thereby permitting additional detail and/or additional objects to be displayed, while maintaining the same overall processing capability.

Accordingly, it is an object of the present invention to reduce computing resources necessary for displaying an image of an object in real-time.

Another object is to minimize the number of polygons necessary to represent an object of a display.

SUMMARY OF THE INVENTION

In accordance with the present invention, in an image generation system wherein an object is represented by a predetermined number of polygons, a method for characterizing the image comprises determining the value of a predetermined viewing criterion and representing the object with a single polygon when the value of the viewing criterion reaches a predetermined threshold value. Viewing criteria may include the range of the object from a view-point, the difference in height between the object and the view-point, the nature of the object and the angular displacement of the object with respect to a predetermined view-ray from the view-point to the scene or a combination thereof.

In one embodiment of the present invention, the single polygon is rotatable about an axis, preferably lying in the plane of the polygon. The polygon can be rotated about the axis so that a normal to the plane of the polygon points to a plumb line through the view-point whenever the object moves with respect to the view-point. The axis may be a plumb axis that readily permits the polygon to accommodate ground or low altitude view-points.

In another embodiment, the single polygon is rotatable about a pair of mutual orthogonal axes, preferably lying in the plane of the polygon. The polygon can be rotated about the axes so that a normal to the plane of the polygon points to the view-point whenever the object moves with respect to the view-point. That is, the relationship between the polygon and the view-point can be maintained such that the polygon is always perpendicular to a view ray from the view-point.

Regardless of the number of axes about which the single polygon is free to rotate, representation of an object by a single polygon reduces the number of computations needed to determine the orientation of the polygon over schemes requiring more than one polygon to characterize the object. Further, object detail is not generally sacrificed when the object is represented by a single polygon since appropriate selection of the viewing criterion permits objects that would be represented by relatively few polygons, e.g. an object remote from the view-point or one that ordinarily does not require much detail, to be represented by a single polygon that is maintained in a predetermined relationship with respect to the view-point.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

In computer image generation, and especially real-time image generation, the number of objects and/or the detail with which they can be displayed in a scene is limited by the computational resources of the system. Typically a trade-off must be established between the amount of realism, i.e. detail, necessary to characterize an object and the number of objects needed, or desired, to reflect accurately the scene being displayed. Since many real-time image generation systems are used for training operators to perform tasks, e.g. piloting a plane or maneuvering a vehicle, the actual display is often most detailed in the area expected to be perceived by the foveal region of the eye, with peripheral objects requiring less detail to function as a useful training cue. Further, objects distant from the view-point may be displayed with less detail while still exhibiting sufficient realism to assist adequately in the training process.

Of course, many decisions regarding the type and number of objects to be displayed, and the detail required for each, are subjective and thus may vary among programmers. However, the present invention is applicable to any system wherein additional computing resources are desired for providing more detail and/or objects in specified areas of the scene to be displayed without compromising the use to which the image generation system is directed or necessitating extra processing capability.

Figure 1:
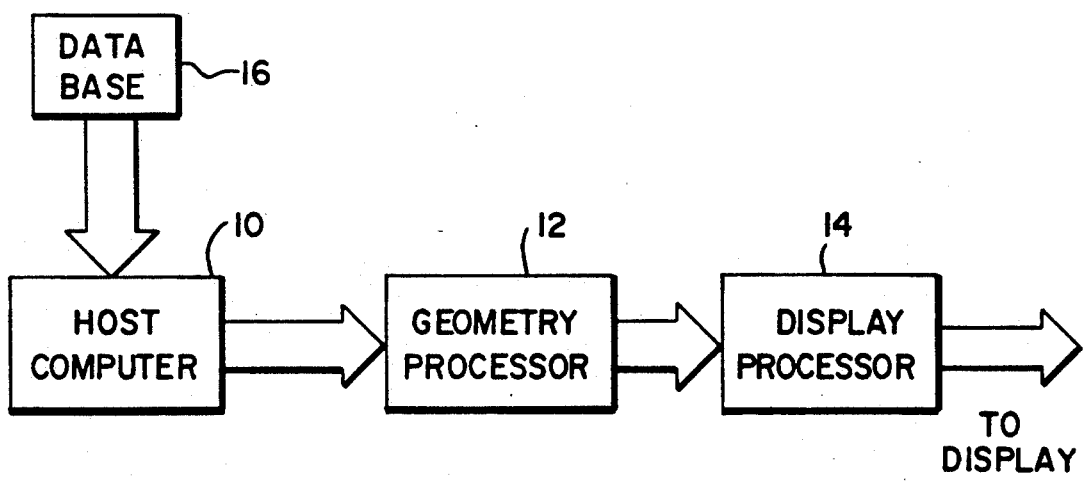
FIG. 1 is a block diagram of a typical real-time image processor.

Referring to FIG. 1, a block diagram of a typical real-time image generation system is shown. The system comprises a host or control computer 10 having inputs coupled to a data base 16 and outputs coupled to a geometry processor 12 that is connected to a display processor 14. Host computer 10, geometry processor 12 and display processor 14 may also represent Frame I, Frame II or a vector processor, and Frame III, respectively.

Host computer 10 provides data base management. Data base 16 includes information for describing the scenes to be displayed. Polygon descriptors, such as the coordinates of the vertices, are maintained in the data base with a respective normal for each polygon defined to point in a reference direction, e.g. north. The definition of a normal to a polygon is implicit for an orthogonal or rotatable polygon when a reference direction is specified. Fixed polygons have a normal explicitly defined in the data base. Host computer 10 also determines which objects are to be in a scene to be displayed.

Geometry processor 12 provides translation and rotation of the polygons defining objects to be displayed for effecting perspective modifications in preparation for further processing by display processor 14. Geometry processor 12 also determines appropriate attribute orientation, such as texture and shading, for the polygons to be used. Display processor 14 operates on information received from geometry processor 12 to supply data for a display (not shown).

Figure 2:
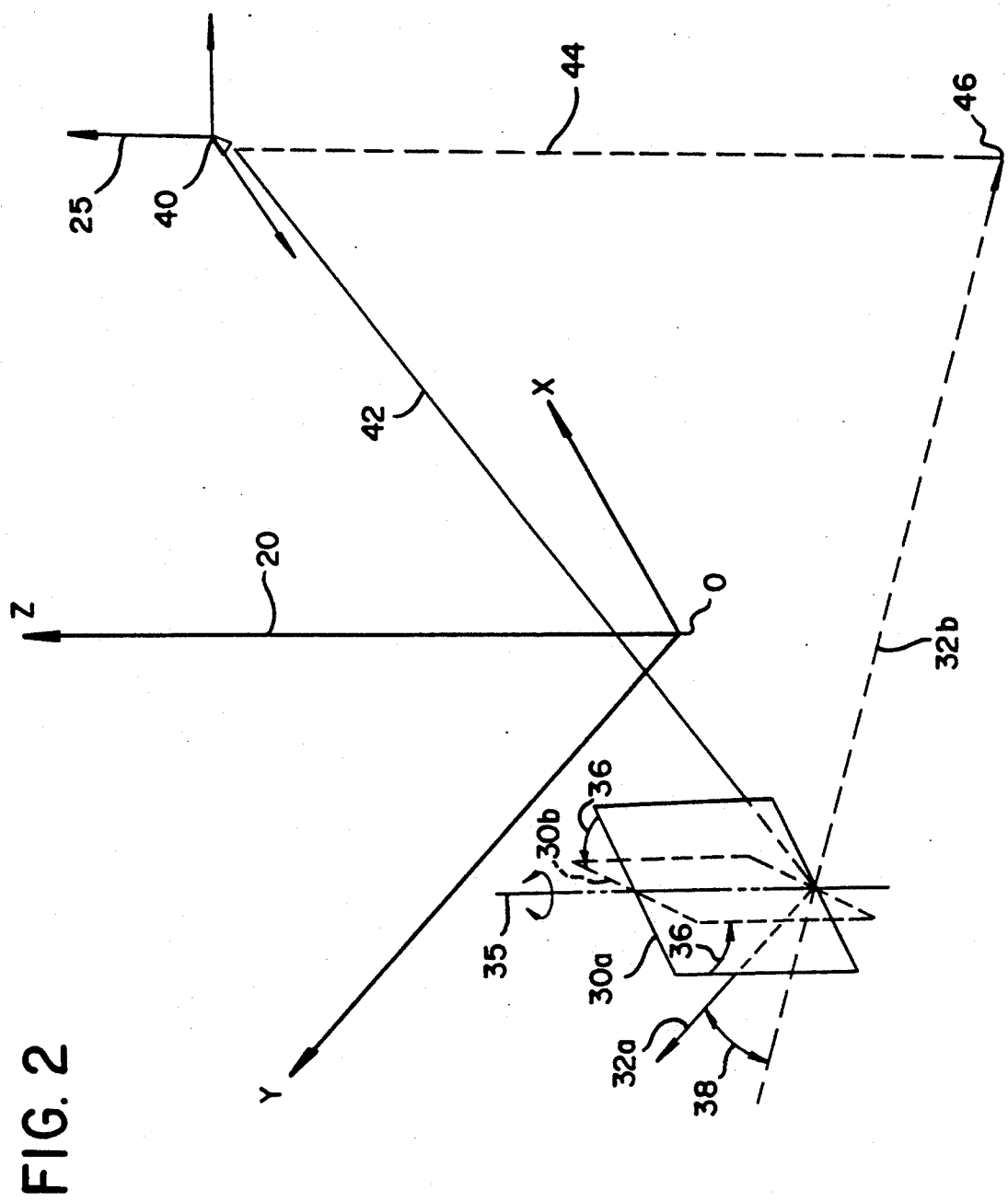
FIG. 2 is a schematic diagram of a single polygon representation of an object in accordance with one embodiment of the present invention.

Referring to FIG. 2, a schematic diagram of a single polygon representation of an object or feature in accordance with one embodiment of the present invention is shown.

Coordinate system 20 includes mutually orthogonal axes X, Y and Z with an origin disposed at a predetermined location. System 20 may be designated as the environment, global, world or master coordinate system and is the system to which all information in data base 16 (FIG. 1) is referenced. For convenience one of the axes, say axis Y, may be designated north. A secondary or viewer coordinate system 25 includes three mutually orthogonal axes with the origin disposed at a view-point 40.

A representative polygon 30a, having a normal 32a parallel to axis Y of system 20, is shown as it could be configured with respect to system 20 from the descriptors of polygon 30a that are stored in data base 16. When one or more predefined viewing criteria are satisfied in accordance with the present invention, then an object to be displayed is represented by a single polygon, such as polygon 30a. Objects that are able to be defined by a single polygon, such as may be determined by subjective and/or objective standards applied to the type of display desired and the purpose for which it is to be used, are flagged or identified in data base 16.

In order to present polygon 30a for further processing, the polygon descriptors received from data base 16 are modified by either host computer 10 or geometry processor 12 (FIG. 1) in coordinate system 20 so that polygon 30a appears rotated about axis 35, which lies in the plane of and intersects a boundary of polygon 30a, through angle 36 to the position of polygon 30b, such that a normal 32b of polygon 30b points to or is directed toward a plumb ray 44 through view-point 40. An extention of normal 32b strikes plumb ray 44 at point 46. Normal 32a of polygon 30a is likewise rotated through angle 38 to coincide with normal 32b of polygon 30b. Thus, a plane defined by plumb ray 44 and a view ray, or line of sight, 42, wherein view ray 42 strikes plane 30b along axis 35, is perpendicular or orthogonal to plane 30b. This relationship between plane 30b and view-point 40 is maintained in real-time to compensate for any relative movement between view-point 40 and plane 30b by updating during each processing or frame cycle the data descriptors for plane 30a to form descriptors for plane 30b.

Axis 35 may assume any orientation with respect to view-point 40. However, for many applications it will be beneficial that axis 35 be vertical or plumb, or substantially so. In addition, for ease of computation it is desirable, although not necessary, that axis 35 lie in the plane of polygon 30a. But, in any event, it is preferable that axis 35 lies parallel to the plane of polygon 30a. For displays wherein the view-point and the feature are at the same relative level, such as the relation between surface features and an operator of a ground vehicle, a vertical orientation of axis 35 may be used.

Surface features for which definition by a single polygon may be appropriate include: trees; shrubbery; silos; geologic formations, e.g. boulders, hills, mountains; and other objects wherein presentation of a great amount of detail is not deemed necessary for achieving the purpose for which the display is being generated. For other features wherein the view-point and the feature are not at the same relative level, such as a cloud formation and an operator of a ground vehicle, or an airplane pilot and a spherical water tower, a generally horizontal orientation of axis 35 may be preferred. It should be understood that the orientation of axis 35 for each feature or polygon 30a may be independently selected so that determining an orientation of axis 35 for one feature does not necessarily constrain the orientation for another feature. For a vertical orientation of axis 35, lateral motion of view-point 40 with respect to polygon 30b, causes the data descriptors from data base 16 (FIG. 1) to be modified so that normal 32b and plumb ray 44 maintain their desired relationship.

Figure 3:
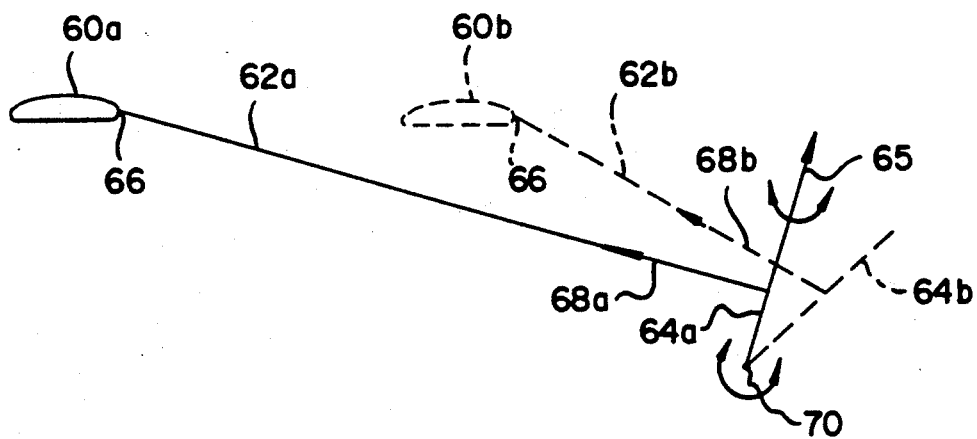
FIG. 3 is a schematic diagram of a single polygon representation of an object in accordance with another embodiment of the present invention.

Referring to FIG. 3, a schematic diagram of another embodiment of a single polygon representation of an object in accordance with the present invention is shown.

A polygon 64a is depicted edge-on. Mutually orthogonal axes 65 and 70, about which polygon 64a is freely rotatable, both lie in the plane of polygon 64a and intersect within the boundaries of polygon 64a, although like axis 35 (FIG. 2), one or both of axes 65 and 70 need not lie in, but are preferably parallel to, the plane of polygon 64a. For many applications it will be beneficial that axis 70 be horizontal so that axis 65 is disposed in a vertical plane. A view-ray, or line of sight, 62a from a view-point 66 of an aircraft 60a strikes polygon 64a along axis 65. Data descriptors of polygon 64a from data base 16 (FIG. 1) are modified analogously to those of polygon 30a (FIG. 2) so that polygon 64a may rotate about both axis 65 and axis 70 such that a normal 68a of polygon 64 is directed at view-point 66 of aircraft 60a. Thus, view-ray 62a is perpendicular to polygon 64a.

As aircraft 60a moves to position 60b, data descriptors from data base 16 (FIG. 1) for polygon 64a are modified so that polygon 64a is rotated about axis 70 to position polygon 64b such that a normal 68b of polygon 64b points directly at view-point 66 of aircraft 60b. If aircraft 60a were to move laterally, i.e. into or out of the Figure, with respect to polygon 64a, then data descriptors for polygon 64a would be modified to provide appropriate rotation of polygon 64a about axis 65 to maintain the orthogonal relationship between view-ray 62a and polygon 64a. Of course, for certain movement of aircraft 60a with respect to polygon 64a, a rotation about both axes 65 and 70 may be required to maintain the orthogonal relationship between polygon 64a and view-ray 62 from view-point 66. Further, view-point 66 may be disposed in an operator area of a land based test or simulation facility so that an operator is looking onto the scene.

Figure 4:
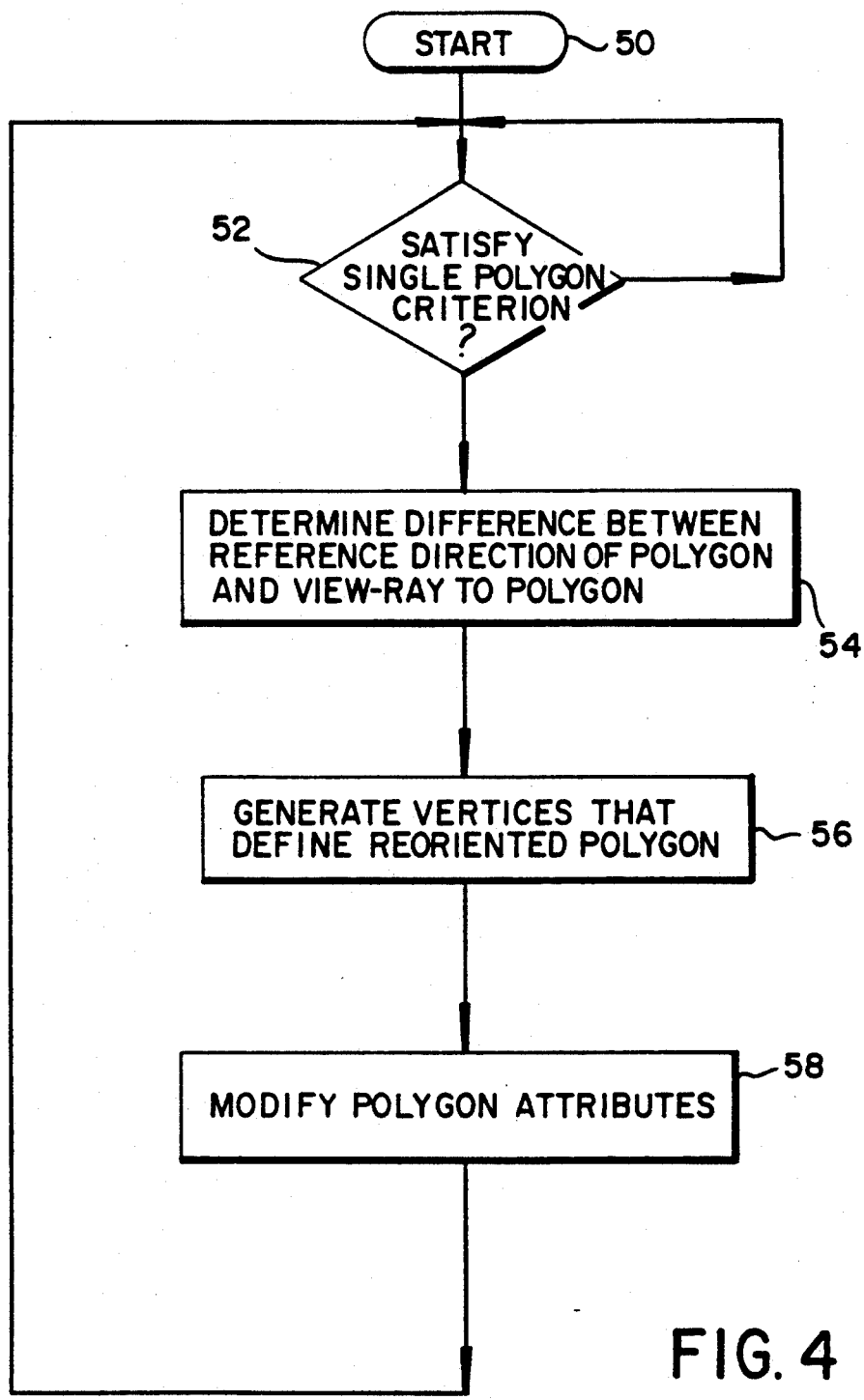
FIG. 4 is a flow diagram of a procedure useful with the present invention.

Referring to FIG. 4, a flow diagram of a procedure useful with the present invention is shown. An object or feature is predeterminedly flagged or identified to signify that it is capable of being represented by a single polygon and to indicate the number and direction of axes about which the single polygon is free to rotate. The procedure begins at step 50 and then executes step 52 to determine whether the object or feature satisfies a predetermined criterion or group of criteria that allow the feature or object to be represented by a single polygon.

In general, the more polygons used to represent an object, the greater is the detail able to be displayed but also the greater are computing resources needed to process the polygons and associated attributes thereof. Criteria used for determining when an object can be represented by a single polygon may be the same or similar to those used to determine transitions between different levels of detail. The criteria, one or more of which are used to determine when a single polygon can be used to represent a feature, include: the range of the feature from the view-point, the difference in altitude between the view-point and the feature, the angular displacement of the object with respect to a predetermined view-ray from the view-point to the scene, the nature of the feature, e.g. symmetrical features such as a sphere or a cylinder that may be appropriate for defining certain trees, for example, are more likely to be able to be depicted by a single polygon without significantly sacrificing realism, and a subjective and/or objective decision regarding the need for additional detail for the feature. As an example, the single polygon criterion may be satisfied when the viewing criterion reaches a predetermined threshold value. Typically, this will occur when the range from the view-point and/or the difference in altitude between the view-point and the feature and/or the angular displacement of the object with respect to the line of sight are greater than a predetermined limit. If the single polygon criterion is not satisfied, the procedure follows the NO path and returns to execute step 52. Step 52 is performed during each update cycle, preferably during the early portion of the cycle of geometry processor 12 or during a cycle of host computer 10.

When the single polygon criterion is satisfied, the procedure follows the YES path to step 54. Performance of step 54 determines the difference between the reference direction of a polygon, as indicated by a normal to the polygon, and a vector or view-ray from the view-point to the polygon.

Performance of step 56 generates vertices from data descriptors of the polygon supplied from data base 16 (FIG. 1) that define a reoriented, i.e. rotated, polygon in coordinate system 20 (FIG. 1), wherein the reoriented polygon has a normal pointing at a plumb vector (single axis of rotation) through the view-point or at the view-point (more than one axis of rotation) as hereinbefore described.

Execution of step 58 modifies attributes (if any), such as texture and shading, of the single polygon that is representative of the object as a whole in accordance with the present invention. The data descriptors, e.g. vertices and attributes, for the reoriented polygon are passed from geometry processor 12 (FIG. 1) to display processor 14 (FIG. 1). The fact that a reorientation of the polygon and modification of polygon attributes has occurred prior to being received by display processor 14 (FIG. 1) is not recognized by display processor 14, wherein the reoriented polygon is treated and processed like all other polygons of the system. After performance of step 58, the procedure returns to step 52 to await execution of step 52 during the next update cycle.

By representing an object with a single polygon in accordance with the present invention, computing processing time required to define and present the object is reduced, thereby freeing computing resources to process other portions of the display where more detail or additional objects may be used without need to add hardware.

Thus has been illustrated and described a method for reducing computing resources necessary for displaying an image of an object in real-time and for minimizing the number of polygons necessary to represent an object of a display.

While only certain preferred features of the invention have been shown by way of illustration, many modifications and charges will occur to those skilled in the art. It is to be understood that the appended claims are intended to cover all such modifications and changes as fall within the true spirit and scope of the invention.

What is claimed is:

1. In a real-time image generation system wherein an entire object is representable by a plurality of polygons, a method for reducing computation time for generating that entire object in an image to be displayed, comprising:

determining the value of a predetermined viewing criterion with respect to a view-point for the entire object;

representing the entire object of the plurality of polygons when the value of the viewing criterion is less than a predetermined threshold value;

representing the entire object by a single polygon when the value of the viewing criterion is not less than the predetermined threshold value, wherein the single polygon is rotatable about a first axis and includes attributes representative of the object as a whole; and maintaining a predetermined relationship between the object and the view point by rotating the single polygon about the first axis to accommodate relative motion between the view-point and the object;

wherein computation time for defining the object is reduced by representing the object by the single polygon with respect to representing the object by a plurality of polygons.

2. The method as in claim 1, wherein the viewing criterion includes an element selected form a group consisting of the range of the object form the view-point, the difference in height between the object and the view-point, the difference in height between the object and the view-point, the nature of the object and the angular displacement of the object with respect to a predetermined view-ray from the view-point to the image or a combination thereof.

3. The method as in claim 2, wherein the first axis is vertical.

4. The method as in claim 2, wherein the first axis is horizontal.

5. The method as in claim 2, wherein the first axis is vertical and lies in the plane of the single polygon.

6. The method as in claim 2, wherein the first axis is horizontal and lies in the plane of the single polygon.

7. The method as in claim 3, wherein the step of maintaining further includes keeping a normal to the plane of the single polygon directed toward a plumb vector through the view-point.

8. The method as in claim 5, wherein the step of maintaining further includes keeping a normal to the plane of the single polygon directed toward a plumb vector through the view-point.

9. The method as in claim 1, wherein the step of maintaining further includes:
defining the single polygon to be rotatable about a second axis wherein the first and second axes are mutually orthogonal; and
keeping a normal to the plane of the single polygon directed toward the view-point.

10. The method as in claim 9, wherein the first and second axes lie in the plane of the single polygon and one of the first and second axes is horizontal.

11. In an image generation system, wherein an entire object to be displayed is representable by a plurality of polygons, a method for characterizing the entire object, comprising:

determining the value of an predetermined viewing criterion with respect to a view-point;
representing the entire object by the plurality of polygons when the value of the viewing criterion is less than a predetermined threshold value;
representing the entire object by a single polygon when the value of the viewing criterion is not less than the predetermined threshold value, wherein the single polygon is rotatable about a first axis and includes attributes representative of the object as a whole; and
maintaining a predetermined relationship between the object and the view-point by rotating the single polygon about the first axis to accommodate relative motion between the view-point and the object.

12. The method as in claim 11, wherein the viewing criterion includes an element selected from a group consisting of the range of the object from the view-point, the difference in height between the object and the viewpoint, the nature of the object and the angular displacement of the object with respect to a predetermined view-ray from the view-point to the image or a combination thereof.

13. The method as in claim 11, wherein the first axis is vertical and further wherein the step of maintaining includes keeping a normal to the plane of the single polygon directed toward a plumb vector through the view-point.

14. The method as in claim 12, wherein the predetermined relationship includes having a normal to the plane of the single polygon that intersects the first axis pointing to the view-point and further wherein the step of maintaining further includes defining the single polygon to be rotatable about a second axis wherein the first and second axes are mutually orthogonal axes such that the relationship may be maintained by rotation of the single polygon about the first and second axes.

15. The method as in claim 14, wherein the first and second axes lie in the plane of the single polygon and intersect within the boundaries of the single polygon and further wherein the second axis is horizontal.

16. The method as in claim 14, wherein the second axis is horizontal.

* * * * *

UNITED STATES PATENT AND TRADEMARK OFFICE
CERTIFICATE OF CORRECTION

PATENT NO. : 5,191,642

DATED : March 2, 1993

INVENTOR(S) : L. T. Quick et al

It is certified that error appears in the above-identified patent and that said Letters Patent is hereby corrected as shown below:

Column 6:
In claim 1, line 56, "of" (first occurrence) should read --by--.

Column 7:
In claim 2, line 6, "form" should read --from--.

Column 7:
In claim 2, line 7, "form" should read --from--.

Signed and Sealed this

Twenty-third Day of November, 1993

Attest:

BRUCE LEHMAN

Attesting Officer

Commissioner of Patents and Trademarks